United States Patent Office 3,004,045
Patented Oct. 10, 1961

3,004,045
Δ⁵⁽¹⁰⁾-3,6-DIKETO ANDROSTENES
Filippus Johannes Zeelen, Oss, Netherlands, assignor to Organon Inc., West Orange, N.J., a corporation of New Jersey
No Drawing. Filed Oct. 31, 1960, Ser. No. 65,917
Claims priority, application Netherlands Nov. 12, 1959
4 Claims. (Cl. 260—397.4)

The invention relates to new $\Delta^{5(10)}$-oestrene compounds and to a process for the preparation thereof.

A large number of biologically active steroids, both of the 10-methyl and of the 19-nor-methyl series, have a $\Delta^4$-3-keto-group. This group has a high stability on account of the conjugation of the two double bonds and will therefore preferably be formed, as appears, inter alia, from the fact that by oxidation of a $\Delta^{5(6)}$-3-hydroxy-steroid, for instance, by means of the Oppenauer oxidation, not a $\Delta^{5(6)}$-3-keto-steroid is formed but a $\Delta^4$-3-keto-compound.

To be expected was that said group would be stabilised by the presence of a 6-keto group in the relative steroid, because in that case the $\Delta^4$-3-keto group is conjugated with the double bond between the carbon atom 6 and the keto group and consequently forms a triple conjugated system.

A process has been found now for the preparation of new $\Delta^{5(10)}$-3,6-diketo-19-nor-steroids, characterized in that a 3,6-diketo-19-nor-steroid having a double bond between the carbon atoms 4 and 5, or a 5-hydroxy group, is respectively treated with an acid in the presence of an a-protonic solvent or a dehydrating agent and after that, if required, with an acid in the presence of an a-protonic solvent, in consequence of which the double bond between the carbon atoms 4 and 5 shifts to the 5,10-position, or the 5-hydroxy group is split off and a double bond is formed between the carbon atoms 5 and 10.

It is not unlikely that, starting from a 5-hydroxy-19-nor-steriod, first a $\Delta^4$-steroid compound is formed, which, under the influence of the dehydration medium showing an acid reaction, can be converted into the corresponding $\Delta^{5(10)}$-compound. If required, the steroid compound in question is treated, after splitting off the 5-hydroxy group, with an acid in the presence of an a-protonic solvent.

The invention particularly relates to the preparation of the new, biologically active compounds of the general formula:

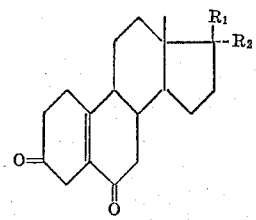

in which $R_1$ = a hydroxyl or acyloxy group,
$R_2$ = hydrogen or a saturated or unsaturated hydrocarbon radical with 1–4 carbon atoms, or
$R_1$ and $R_2$ together = a keto group.

From pharmacological experiments it has appeared that the present compounds exercise a progestative and oestrogenic activity, and gonad-inhibiting properties.

The $\Delta^4$-3,6-diketo-19-nor-steroids to be used as starting products in the present process can be prepared in different manners, for example, by introducing, in a microbiological manner, a 6-hydroxy group in the corresponding in 6-position non-substituted compounds and by oxidizing the thus obtained compound to the desired $\Delta^4$-3,6-diketo compound. It is also possible to start from a $\Delta^4$-3-keto-19-nor-steroid, by enolacylating it to the corresponding $\Delta^{3,5}$-3-acyloxy compound, reacting it, for example, with perphthalic acid and oxidizing the thus obtained $\Delta^4$-3-keto-6-hydroxy compound in any known manner.

According to the invention $\Delta^4$-3,6-diketo-steroids are converted into the corresponding $\Delta^{5(10)}$-3,6-diketo-steroids by treating them with an acid in the presence of an a-protonic solvent. In this reaction both inorganic and organic acids can be used.

By a-protonic solvents are understood solvents having no or only a slight proton-affinity. In the present process generally those solvents are suitable that have a slighter affinity for protons than the $\Delta^4$-3,6-diketo-steroid itself.

As examples of such solvents are mentioned: hydrocarbons, such as benzene and toluene and halogenated hydrocarbons, such as chloroform, carbon tetrachloride and chlorobenzene.

Good results were obtained by allowing the $\Delta^4$-3,6-diketo-steroid to stand for some time, for example for ¼ to 5 hours, in a moderately acid medium in the presence of a halogenated hydrocarbon at a low temperature, for example —5° to 20° C.

The 3,6-diketo-5-hydroxy steroids to be used in the process according to the invention can be prepared by converting a $\Delta^5$-3-hydroxy-19-nor-steroid or 3-ester thereof, in any manner known per se, into the 5,6-dihydroxy compound and oxidizing the thus obtained compound to obtain the 3,6-diketo-5-hydroxy compound. The $\Delta^5$-3-hydroxy- or acyloxy-19-nor-steroid compounds to be used in this process are known as such or can be prepared by enolacylating a $\Delta^4$-3-keto-19-nor-steroid and reducing thereupon the double bond between the carbon atoms 3 and 4 by any method known per se.

The 3,6-diketo-5-hydroxy-19-nor-steroids can be converted into the desired $\Delta^{5(10)}$-3,6-diketo-19-nor-steroids by means of one of the known dehydrating agents, such as a mineral acid, formic acid or oxalic acid. If after dehydration of the 5-hydroxy-steroid the desired $\Delta^{5(10)}$-steroid is not obtained, but the $\Delta^4$-3,6-diketo-steroid, the latter must be treated after that with an acid in the presence of an a-protonic solvent in accordance with the conversion described above.

If the 19-nor-steroids prepared in accordance with the process of the invention have a secondary or tertiary hydroxyl group in 17-position, these may be esterified, if required, with a saturated or unsaturated carboxylic acid in which especially the acids with long carbon chains are of importance to obtain long-acting esters. Preferably carboxylic acids with 1–30 carbon atoms are used.

As examples of acids to be used are mentioned: formic acid, acetic acid, propionic acid, butyric acid, valeric acid, caproic acid, caprylic acid, capric acid, undecylic acid, lauric acid, tridecylic acid, myristic acid, pentadecylic acid, oleic acid, palmitic acid, stearic acid, arachic acid, behenic acid, lignoceric acid, cerotic acid, mentanic acid, myricinic acid, trimethyl acetic acid, diethyl acetic acid, hexahydrobenzoic acid, cyclopentyl propionic acid, cyclohexyl propionic acid, cyclohexyl butyric acid, citronelic acid, undecylenic acid, erucic acid, benzoic acid, phenyl acetic acid, phenyl propionic acid, phenyl butyric acid, phenyl propiolic acid, succinic acid, glutaric acid, pimelic acid, tartaric acid, carbamic acid, glycine and alanine.

The preparation of these esters can take place in any manner known per se by reaction of the 17-hydroxy-steroid with the acid in question, or the anhydride or halide thereof.

The following examples illustrate the invention.

Example I

To a suspension of 25 g. of 17α-methyl-19-nor-testosterone in 100 ml. of dioxane are added 50 ml. of acetic acid anhydride and 250 mg. of dinitrobenzene sulphonic acid. The mixture is stirred for one hour at room temperature, after which 125 ml. of pyridine and 125 ml. of ice water are added to it. The mixture is then stirred again for one hour and next poured out into one litre of ice water. The precipitate formed is filtered, dried and after that crystallised from ethanol to obtain 20 g. of $\Delta^{3,5}$-3,17-diacetoxy-17α-methyl-19-nor-androsterene; melting point 77–80° C.

5 g. of this compound are dissolved in 250 ml. of ethanol, after which a solution of 9 g. of sodium borohydride in 250 ml. of 70% ethanol is added. The mixture is stirred for two hours at room temperature, poured out into water and extracted with chloroform. The chloroform layer is separated, washed and dried and evaporated to dryness. By chromatography over silicagel and crystallisation from a mixture of ether and petroleum ether there is obtained 3.2 g. of the $\Delta^5$-3-hydroxy-17-acetoxy-17α-methyl-19-nor-androstene; melting point 143–146° C. and $[\alpha]_D^{24} = +9°$ (chloroform).

A solution of 2 g. of this compound in 2 ml. of pyridine and 1 ml. of acetic acid anhydride is kept at room temperature for 15 hours, after which 2 ml. of ice water are added. Next the reaction mixture is stirred for 1 hour, then poured into 100 ml. of water and extracted with methylene chloride. The extract is washed with 2 N hydrochloric acid, then with 1 N sodium hydroxide and water, next dried with sodium sulphate and finally evaporated to dryness. The residue is recrystallised from aqueous methanol to obtain the $\Delta^5$-3,17-diacetoxy-17α-methyl-19-nor-androstene.

To a solution of 1.38 g. of this compound in 135 ml. of formic acid 1.6 ml. of hydrogen peroxide are added, after which the reaction mixture is left to stand for one night at room temperature and then poured out into 750 ml. of water. The precipitate formed is filtered off, dried and crystallised from a mixture of benzene and petroleum ether to obtain the 3,5,6,17-tetrahydroxy-17α-methyl-19-nor-androstane-3,17-diacetate-6-formate.

1.35 g. of this compound are added to a mixture of 75 ml. of methanol, 0.45 g. of sodium carbonate. $10H_2O$ and 0.4 ml. of water, after which this mixture is stirred for one night at room temperature and then evaporated in vacuo till nearly dry. The residue is poured out into 100 ml. of ice water, after which the crystals formed are filtered off and dried.

A solution of 1 g. of this compound in 100 ml. of acetone is cooled to 10° C., after which 1.9 ml. of 2.4 N chromic acid are added. After standing some time the mixture is poured out into water, extracted with methylene chloride, washed and dried. The methylene chloride extract is evaporated to dryness and the residue crystallised from ethanol to obtain the 3,5,17-trihydroxy-6-keto-17α-methyl-19-nor-androstane-3,17-diacetate.

1 g. of this compound is dissolved in 50 ml. of methanol, after which 1.3 g. of potassium hydroxide in 10 ml. of water are added. The mixture is left to stand for one night at room temperature, after which it is poured into 100 ml. of water and extracted with chloroform. The extract is evaporated to dryness, after which the residue is suspended in 150 ml. of acetone. To this suspension 2 ml. of 2.4 N chromic acid are added at 10° C., after which it is poured out into water, extracted with methylene chloride, washed and dried. The extract is then evaporated to dryness, after which the residue is crystallised from a mixture of chloroform and petroleum ether to obtain the 3,6-diketo-5-hydroxy-17-acetoxy-17α-methyl-19-nor-androstane.

0.8 g. of this compound is then dissolved in 80 ml. of chloroform, after which for one hour, at 0° C., HCl-gas is bubbled through the solution. Next the mixture is washed with water, dried with sodium sulphate and evaporated in vacuo to dryness. The residue is recrystallised from a mixture of acetone and petroleum ether to obtain the $\Delta^{5(10)}$-3,6-diketo-17β-acetoxy-17α-methyl-19-nor-androstene.

Example II

To a solution of 1.5 g. of 3,5,6,17-tetrahydroxy-17α-methyl-19-nor-androstane-3,17-diacetate, prepared in accordance with the process of Example I, in 100 ml. of tetrahydro furan, 7.8 g. of lithium aluminum hydride in 450 ml. of tetrahydro furan are added, after which the mixture is refluxed for one hour, cooled and after that treated with ethyl acetate in order to decompose the excess of hydride. Next a saturated solution of sodium sulphate is added to the mixture and after that anhydrous sodium sulphate, after which the mixture is filtered off. The filtrate is evaporated to dryness and the residue crystallised from a mixture of methanol and petroleum ether to obtain the 3,5,6,17-tetrahydroxy-17α-methyl-19-nor-androstane.

In accordance with the manner described in Example I this compound is converted into the $\Delta^{5(10)}$-3,6-diketo-17β-hydroxy-17α-methyl-19-nor-androstene.

To a solution of 0.8 g. of this compound in 2.5 ml. of pyridine 0.58 g. of undecylenic acid chloride are added dropwise at 0° C. The mixture is kept at room temperature for 12 hours and after that heated on a steam-bath for 30 minutes. The mixture is then cooled, poured out into 20 ml. of ice water and extracted with ether. The ether extract is washed with 2 N hydrochloric acid, after that with 1 N sodium hydroxide, then dried with sodium sulphate and finally evaporated to dryness. The residue is recrystallised from methanol to obtain the 17-undecylenate of $\Delta^{5(10)}$-3,6-diketo-17β-hydroxy-17α-methyl-19-nor-androstene.

Analogously the hexahydrobenzoate, the 17β-phenyl propionate, the oleate and the pentadecylate are prepared.

In accordance with the process described in this example the $\Delta^{5(10)}$-3,6-diketo-17β-hydroxy-17α-propyl-19-nor-androstene and the $\Delta^{5(10)}$-3,6-diketo-17β-hydroxy-17α-butenyl-19-nor-androstene are prepared starting respectively from the 17α-propyl-19-nor-testosterone and the 17α-butenyl-19-nor-testosterone.

These compounds are converted in any manner known into the 17-esters derived from saturated and unsaturated carboxylic acids.

Example III

To a solution of 5 g. of 3-enol, 17-diacetate of 19-nor-testosterone in 200 ml. of ethyl acetate, 20 ml. of 1 N perphthalic acid are added. The mixture is kept at room temperature for 48 hours, after that washed out with a dilute sodium hydroxide solution, next with water and finally dried with sodium sulphate. The solution is after that evaporated to dryness in vacuo and the residue crystallised from a mixture of acetone and ether to obtain 3.4 g. of the $\Delta^4$-3-keto-6,17-dihydroxy-19-nor-androstene-17-acetate; melting point 189–190° C. and $[\alpha]_D^{29} = -58°$ (chloroform).

2 g. of this solution are dissolved in 200 ml. of acetone after which 3.8 ml. of 2.4 N chromic acid are added to this solution. The mixture is then diluted with water and after that extracted with methylene chloride. The extract is evaporated to dryness and the residue crystallised from a mixture of acetone and ether to obtain the $\Delta^4$-3,6-diketo-17-acetoxy-19-nor-androstene; melting point 169–173° and $[\alpha]_D^{23} = -94°$ (chloroform).

1 g. of this compound is dissolved in 100 ml. of chloroform, after which for one hour, at 0° C., HCl-gas is led through this solution. The solution is after that washed, dried and evaporated to dryness, after which the residue is crystallised from a mixture of acetone and ether. There is obtained the $\Delta^{5(10)}$-3,6-diketo-17β-acetoxy-19-nor-androstene; melting point 191–192.5° C. and $[\alpha]_D^{22} = +108°$ (chloroform).

By saponification of this compound with a methanolic NaOH-solution the free compound is obtained.

To a solution of 1.6 g. of this compound in 11 ml. of pyridine 7 g. of β-phenyl propionic acid anhydride are added. The reaction mixture is further treated as described in Example I to obtain the 17β-phenyl propionate of the $\Delta^{5(10)}$-3,6-diketo-17β-hydroxy-19-nor-androstene. Analogously the trimethyl-acetate, the cyclopentyl propionate, the succinate, the caprylate and the decanoate are prepared.

*Example IV*

In accordance with the manner described in Example I the 17α-ethynyl-19-nor-testosterone is converted into the $\Delta^{5(10)}$ - 3,6 - diketo - 17β - hydroxy - 17α - ethynyl - 19-nor-androstene via the 3,17-diacetoxy-5-hydroxy-6-formoxy-17α-ethynyl-19-nor-androstane. To a solution of 0.8 g. of this compound in 60 ml. of ethanol 150 mg. Pd—BaSO$_4$ (5%) catalyst are added. The solution is shaken in hydrogen atmosphere till 0.003 mol of hydrogen has been taken up. The catalyst is next filtered off and the filtrate evaporated to dryness in vacuo. The residue is crystallised from acetonitrile to obtain the $\Delta^{5(10)}$-3,6-diketo-17β-hydroxy-17α-vinyl-19-nor-androstene.

This compound is converted in the manner described in the previous examples into the 17-esters derived from acetic acid, caproic acid, β-phenyl propionic acid and decane carboxylic acid.

In an analogous manner 17α-allyl-19-nor-testosterone and 17α-propyl-19-nor-testosterone are converted into the corresponding $\Delta^{5(10)}$-6-keto-steroids.

*Example V*

5.4 g. of $\Delta^5$-3β,17β-diacetoxy-19-nor-androstene are dissolved in 54 ml. of formic acid, after which 6.4 ml. of hydrogen peroxide are added. The solution is left standing at room temperature for 20 hours, after which it is poured out into 300 ml. of water. The precipitate formed is filtered off and crystallised from a mixture of benzene and petroleum ether to obtain the 3,17-diacetoxy-5-hydroxy-6-formoxy-19-nor-androstane; melting point 169–169.5° C. and $[\alpha]_D^{26}=-61°$ (chloroform).

5.4 g. of this compound are dissolved in 300 ml. of methanol, after which a solution of 1.8 g. of sodium carbonate in 15 ml. of water is added. The mixture is stirred for 15 hours at room temperature and evaporated in vacuo to a small volume, after which the residue is poured out into 400 ml. of water. The precipitate formed is filtered off to obtain the 3,17-diacetoxy-5,6-dihydroxy-19-nor-androstane, which after crystallisation from acetone has a melting point of 224–225° C. and $$[\alpha]_D^{23}=-29°$$

(chloroform).

4 g. of this compound are dissolved in 400 ml. of acetone, cooled to 0° C., after which 7.5 ml. of 2.4 N chromic acid are added. The reaction mixture is after that poured out into water and extracted with methylene chloride, washed, dried and evaporated to dryness, after which the residue is crystallised from ethanol. There is obtained the 3,17-diacetoxy-5-hydroxy-6-keto-19-nor-androstane; melting point 209–210° C. and $[\alpha]_D^{26}=-79°$.

By saponification of this compound in the manner described in Example I the 3,5,17-trihydroxy-6-keto-19-nor-androstane is obtained; melting point 265–266° C. and $[\alpha]_D^{29}=-48°$ (tetrahydrofuran).

By oxidation of this compound with chromic acid in the manner described in Example I the 3,6,17-triketo-5-hydroxy-19-nor-androstane is obtained; melting point 218–219° C. and $[\alpha]_D^{27}=+58°$ (chloroform).

3.5 g. of this compound are dissolved in 350 ml. of chloroform, after which HCl-gas is bubbled through at 0° C. The reaction mixture is worked up as described in Example I, after which the $\Delta^{5(10)}$-3,6,17-triketo-19-nor-androstene is obtained; melting point 168–170° C. and $[\alpha]_D^{27}=+223°$ (chloroform).

I claim:

1. New steroids of the general formula:

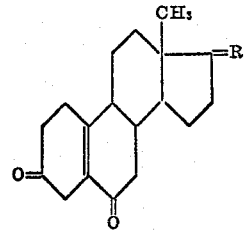

in which R is selected from the group consisting of O, H(βOH), H(βOAcyl), αX(βOH) and αX(βOAcyl), in which X is selected from the group consisting of a saturated and unsaturated hydrocarbon radical with 1–4 carbon atoms.

2. New steroids of the general formula:

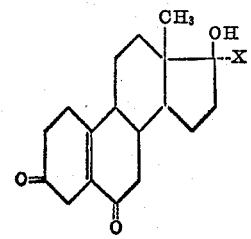

in which X is selected from the group consisting of a saturated and unsaturated hydrocarbon radical with 1–4 carbon atoms.

3. $\Delta^{5(10)}$-3,6-diketo-17β-hydroxy-17α-methyl-estrene.
4. $\Delta^{5(10)}$-3,6-diketo-17β-hydroxy-17α-ethyl-estrene.

References Cited in the file of this patent

Zderic et al.: J.A.C.S. 81, 3120–3124 (1959).